Feb. 15, 1966  L. G. KILMER  3,235,027
DEVICE FOR INITIATING SEISMIC WAVE
Filed April 12, 1962  3 Sheets-Sheet 1

INVENTOR.
LAUREN G. KILMER
BY
Adams, Forward and McLean
ATTORNEYS

Feb. 15, 1966  L. G. KILMER  3,235,027
DEVICE FOR INITIATING SEISMIC WAVE
Filed April 12, 1962  3 Sheets-Sheet 2
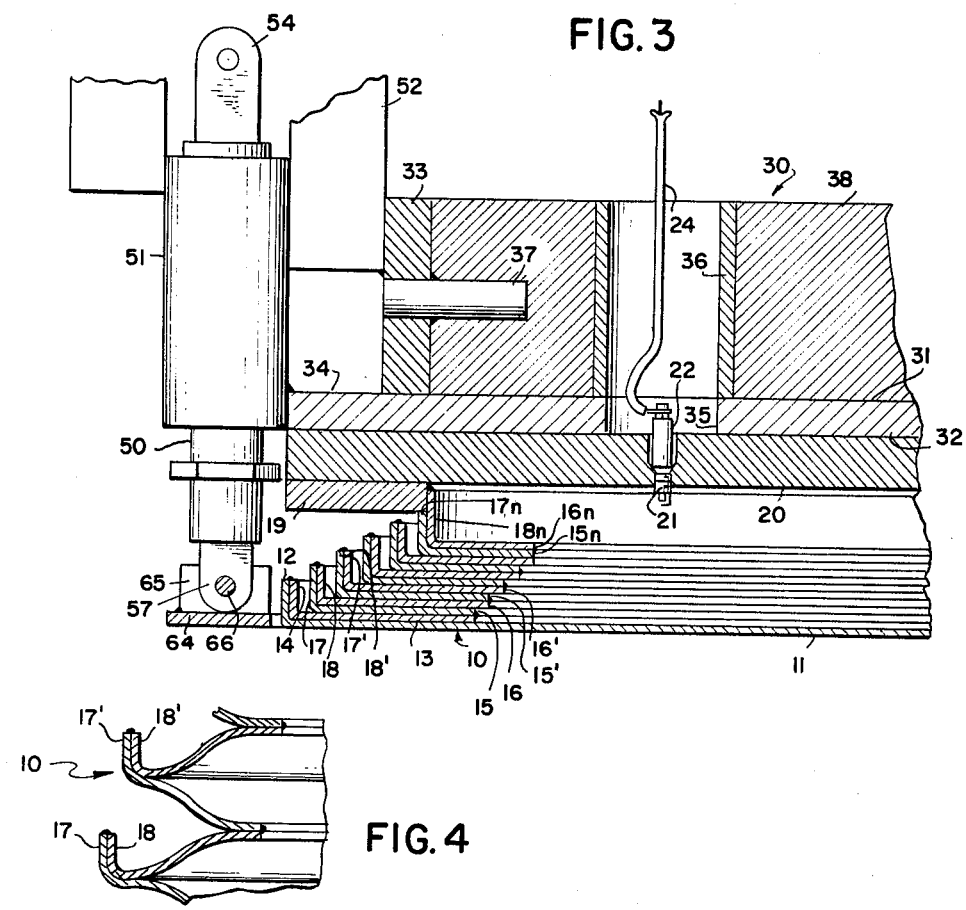
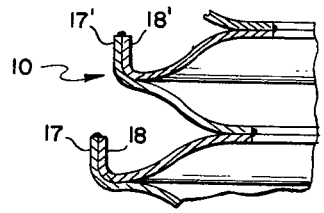
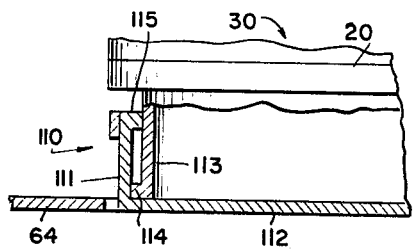
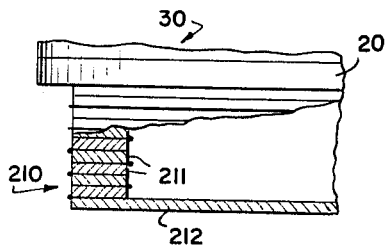
INVENTOR.
LAUREN G. KILMER
BY
Adams, Forward and McLean
ATTORNEYS Feb. 15, 1966 L. G. KILMER 3,235,027
DEVICE FOR INITIATING SEISMIC WAVE
Filed April 12, 1962 3 Sheets-Sheet 3

INVENTOR.
LAUREN G. KILMER
BY
Adams, Forward and McLean
ATTORNEYS

United States Patent Office
3,235,027
Patented Feb. 15, 1966

3,235,027
DEVICE FOR INITIATING SEISMIC WAVE
Lauren G. Kilmer, Tulsa, Okla., assignor to Sinclair Research, Inc., New York, N.Y., a corporation of Delaware
Filed Apr. 12, 1962, Ser. No. 187,111
8 Claims. (Cl. 181—.5)

My invention relates to geophysical prospecting and in particular provides for imparting a compressive impulse at the earth's surface.

Although conventionally in seismic prospecting the seismic waves utilized to study the subsurface structure of the earth are initiated by detonation of a buried charge of explosive, there frequently arise situations where such techinques of wave generation are not feasible. Thus for example in relatively populated areas not only is the required explosive detonation hazardous, but the noise created is highly objectionable. Frequently also, particularly when seismic noise levels are high, the detected signals are obscured, and techniques such as cross-correlation are required. In the last case a second charge of explosive may be required to permit cross-correlation since it is desirable that the impulses have as nearly identical characteristics as possible. Since more than one buried explosive charge cannot be fired exactly at the same position, optimum benefits of this mathematical tool are not available.

As a result recently devices have been developed for initiating seismic waves other than by detonation of an explosive charge. Such devices as "weight droppers" thus can be used to generate a plurality of seismic waves from a single position or to generate seismic waves in relatively populated areas without the disadvantages involved in the detonation of explosives. Such devices as weight droppers are, however, subject to the disadvantage that relatively cumbersome and complicated equipment is required, since typically weights on the order of 2½ tons must be dropped a distance of 9 or 10 feet in order to produce an impact adequate to generate a seismic wave which can be detected after reflection from any significant depth. Weight droppers are also subject to the disadvantage that accurate determination of the time of impact can be determined only after recording of the reflection signals, and hence individual realignment of the recordings is required after each drop. Other mechanical devices for initiating seismic waves, such as hydraulic pounders and spring loaded devices are also subject to similar disadvantages.

It is a primary object of my invention to provide a device for imparting a compressive impulse at a position on the surface of the earth which will apply sufficient compressive stress at the earth to initiate a seismic wave having sufficient energy to permit detection of reflections by conventional methods, which can be repeatedly used at the same position to generate a number of identical seismic waves at known intervals thus permitting cross-correlation techniques to be employed in their analysis, and which can be used in relatively populated area without the danger inherent in the detonation of explosive charges and without significant generation of air waves which would obscure detection of reflected or refracted seismic waves.

It is a further object of my invention to provide such a device having relatively compact construction which although heavy is readily portable. Still another object of my invention is to provide such a device which is readily amenable to pulsed or sequential firing at controlled, equal or variable, time intervals. It is yet another object of my invention to provide such a device in which extremely accurate determination of the time of the impulse can be made, permitting precise calculation based on the detected seismic reflections or refractions. It is a further object of my invention to provide means for varying the shape and duration of the seismic impulse in a manner independent of the characteristics of the ground, and also independent of the energy content of the impulse, advantages not available with any existing seismic source.

Although the device of my invention has its principal applicability in the initiation of seismic waves it will become apparent hereinafter that it is susceptible to other usage as for example in compacting earth fills for roads, dams and the like.

These and other objects of my invention are essentially obtained by means of a gas explosion confined in an expansible chamber acting at the earth-air interface against a large mass with great inertia. Thus I provide a device including a chamber resting on the ground which is vertically extensible and on which a substantial mass is placed such that the chamber can be charged with an explosive or nearly explosive mixture of combustible gases, by which term I mean vapors of normally liquid and solid materials as well as fixed gases, and of oxygen or air, or other gases which when ignited provide a confined explosion within the chamber. The resultant shock wave produced by the burning gases within the chamber places great pressure upon the earth and upon the weight above. Since the explosion occurs in a very short time and since the weight has considerable inertia, pressure is exerted on the earth and on the weight above until the pressure is relieved, either by the weight moving enough to permit expansion of the chamber, or by cooling of the combustion gases, or both. Such pressure thus applies the desired compressive impulse at the surface of the earth beneath the chamber to initiate a seismic wave.

I am aware that it has heretofore been proposed to initiate seismic waves by confined explosions at the surface of the earth. Thus, for example, in Merten U.S. Patent No. 2,772,746, it is suggested that such a technique can be carried out employing an open-bottomed bell resting on the surface of the earth and in which an explosive mixture of gases is ignited. The device of my invention is to be distinguished from such prior suggestion, since the sidewalls of the chamber of my device in which the confined explosion takes place are extensible vertically. Generation of an air wave would occur upon the escape of the exploding gases, if an open-bottomed bell is employed, the moment following the explosion that the bell lifts from the ground. The device of my invention, since the chamber remains closed and all expansion is vertical, minimizes generation of an air wave which could interfere with the detection of the seismic wave.

I am aware that it has also been suggested that to restrain such release of the exploded gases using an open-bottomed bell by covering the bottom of the bell with a thin, flexible diaphragm, such as a rubber membrane. Such suggestion is again to be contrasted with the device of my invention in which, rather than employing a flexible bottom of relatively weak character to confine the exploded gases, I construct the side walls of the chamber so as to accommodate the expanding gases entirely by the vertical extension of the side walls, which can be of steel or similar durable materials thereby minimizing the danger of rupture.

In connection with this aspect of my invention, it is thus a further object of my invention to provide a bellows construction which can be fabricated of ferrous metals or similar materials and have particular resistance to rupture upon sudden and high increase in the pressure within the bellows. To this end, in the preferred construction of my invention, a bellows is employed which is constructed of a stack of annular plates having turned flanges at their rims. In order to accommodate the flanges the plates are of serially increasing or decreasing diameter to permit them to nest when stacked. The plates in the stack are welded to their adjacent plates, alternately along the edges of the turned flanges and along their inner edges, to provide an accordion-like bellows construction.

This construction has the advantage that when a high pressure is suddenly built up within the bellows and the bellows expands the effect is to place extreme force between pairs of plates joined along their outer edges tending to spread them apart. By providing at each such outer joint an upwardly or downwardly turned pair of flanges, I effectively obtain a rigid construction which cannot be spread apart at the point where the edges are joined, and thus prevent or at least reduce the stress at the welded joint. Such a construction could also be utilized at the inner joints of the stack of annular plates but has not been found necessary since the pressure of the exploding gases tends to prevent rupture of the welded inner joints by tending to resist separation of the plates where they are joined at their inner edges.

Preferably some device or arrangement is provided to prevent the weight from falling back to the ground after the explosion in order to prevent a second impulse which could generate a second seismic wave interfering with the desired results. Thus for example where the weight is of sufficient mass to prevent the bottom of the chamber from leaving the ground this can be accomplished by controlling the release rate of the exploded gases from the chamber to provide a cushioned return of the weight to its normal position. Alternatively the weight can be mounted on shock absorbers having a fast rise, slow fall characteristic.

For a more complete understanding of the practical application of my invention reference is made to the appended drawings in which:

FIGURE 3 is a fragmentary enlarged vertical section taken at line 3—3 in FIGURE 2;

FIGURE 4 is a portion of the view shown in FIGURE 3 in a position assumed during operation of the device shown in FIGURES 1 and 2;

FIGURE 5 is a fragmentary view similar to FIGURES 3 and 4 illustrating a modification of the portion of the device shown in FIGURES 3 and 4;

FIGURE 6 is a view similar to that of FIGURE 5 illustrating yet another modification of the same portion of the device;

Figure 2:
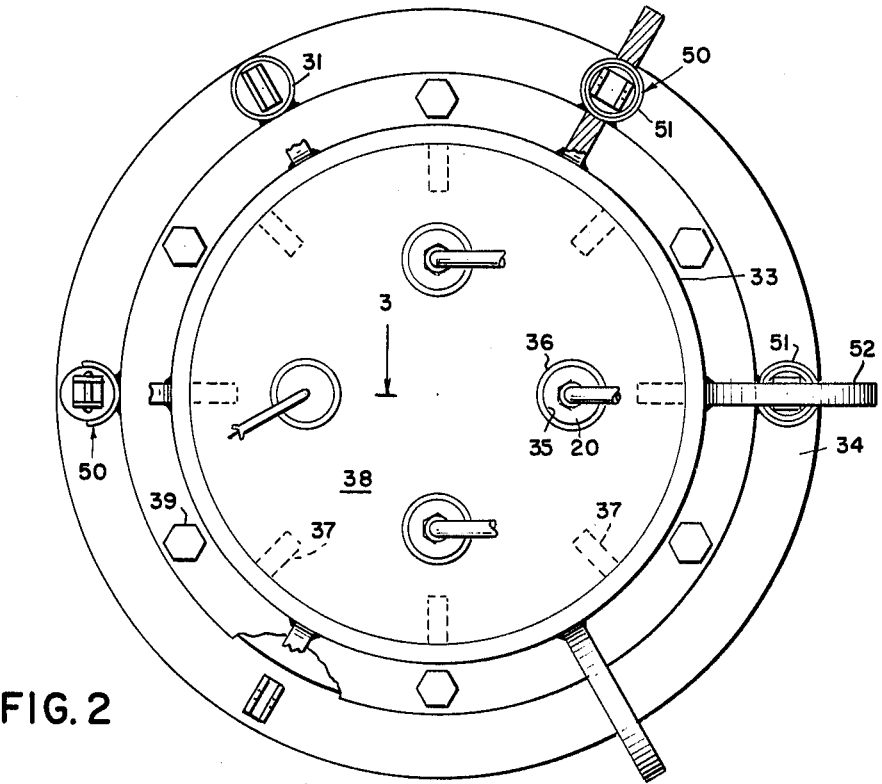
FIGURE 2 is a plan view of the device shown in FIGURE 1.
Figure 1:
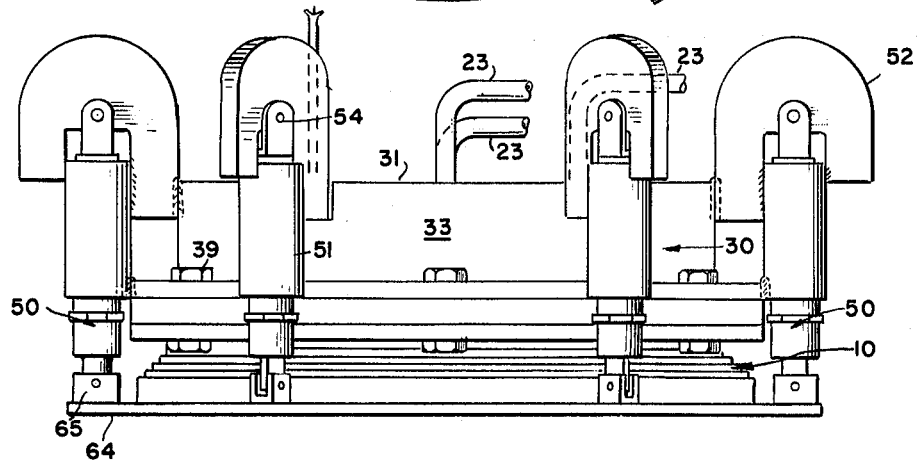
FIGURE 1 is an elevation of a device constructed in accordance with my invention.

Referring more particularly to FIGURES 1 and 2 the device of my invention basically includes a vertically extensible bellows 10 on the top of which is a substantial weight 30, additionally supported peripherally by a number of fast rise, slow fall shock absorbers 50.

Bellows 10, referring more particularly to FIGURES 3 and 4, consists of a rigid bottom plate 11, typically ⅜ inch thick steel sheet, of general circular shape and having an upwardly turned flange 12 about its rim. An annular steel plate 13 of similar thickness and outside diameter rests on plate 11 and similarly has an upwardly turned flange 14 which fits snugly inside of flange 12 of bottom plate 11. Above these are arranged a number of pairs of annular steel plates 15 and 16, 15' and 16', etc., each pair of such plates being similarly provided with upwardly turned flanges 17 and 18, 17' and 18', etc., respectively, with each plate 16, 16', etc. resting on top of its associated plate 15, 15' etc., with each flange 17, 17' etc. snugly fitting inside the flange 18, 18' etc., respectively, and with the pair of plates 15 and 16 immediately resting on plates 11 and 13, plates 15' and 16' immediately resting on 15 and 16 and so forth.

Each pair of plates 15 and 16, 15' and 16', etc. is distinguished from the immediately lower pair of plates by a lesser outside diameter resulting in spacing between the upwardly turned flanges on the rims of each successively stacked pair of plates. Typically ten pairs of plates are so stacked (only five pairs are shown in the drawings for sake of clarity). The annular width of such plates should be sufficient that the annular area of the top pair of plates $15^n$ and $16^n$ substantially overlaps the annular area of the bottom annular plate 13 in order that adequate support will be provided for weight 30 mounted above bellows 10. Each pair of plates forming bellows 10, such as plates 11 and 13 and plates 15 and 16, is joined by welding the upper ends of their adjacent upwardly turned flanges, such as flanges 12 and 14 and flanges 17 and 18, while adjacent pairs of such plates are joined to make the stack of plates a unitary structure by welding the upper plate of one pair to the lower plate of the next pair, as for example plates 13 and 15, along the inner edges of their annular portions. Thus, for example, while plates 13 and 15 have substantially different outside diameters, the inside diameters of their central openings are the same. For convenience in welding, while each upper plate of one pair and lower plate of the pair next above have the same inside diameter, as for example plates 13 and 15, the lower plate of each pair has a greater inside diameter than the upper plate of such pair, as for example plates 15 and 16.

This organization is followed throughout the plates in the stack except that the top pair of plates $15^n$ and $16^n$ has the same inside diameter and is welded along the inside edge of each together with the upper plate of the immediately lower pair and that the upper end of flange $18^n$ is higher than the upper end of flange $17^n$ to receive the inner edge of an annular plate 19 to which flanges $17^n$ and $18^n$ are welded, which overlies the upper ends of the various flanges on the lower pairs of plates and which has its outer edge approximately aligned above the outer edge of flange 12.

Plate 19 carries the rigid top 20 of bellows 10 which is a circular plate of steel having a thickness on the order of two inches and on the upper surface of which weight 30 is mounted. Top 20 is provided with four vertical, tapped apertures 21 spaced at intervals about its center. One aperture 21 threadedly receives a spark plug 22, the points of which are inside bellows 10, while each of the remaining apertures 21 are provided with conduit connections 23 to permit access to the interior of bellows 10.

Weight 30 includes a tank 31 having a flat circular bottom 32 and an upwardly extending cylindrical side wall 33 coaxially positioned with the center of bottom 32 but having an outer diameter of less than that of bottom 32 leaving an annular shelf 34 on the upper surface of bottom 32 projecting outwardly beyond side wall 33. Bottom 32 is particularly provided with four vertical apertures 35 spaced at intervals about its center within the confines of side wall 33. Apertures 35 have diameters larger than those of apertures 21 in top 20 and overlie such apertures 21. Upwardly extending sleeves 36 are provided with their lower ends on bottom 32 registering with apertures 35. One sleeve 36 receives a high voltage ignition wire 24 connected to spark plug 22, and the other three sleeves receive conduits 23, all of which extend upwardly through sleeves 36 for appropriate external connection. Suitably bottom 32, side wall 33 and sleeves 36 are welded together to provide a unitary structure. Side wall 33 is further provided with inwardly and radially extending short rods 37 spaced at intervals about side wall 33 and a heavy metal such as lead is cast in tank 31 filling the space confined by side The central aperture 321 of top 320 carries a cylinder 322 which at its upper end has an outwardly turned flange 323 overlying the inner edge of top 320 and which is welded to top 320. Cylinder 322 extends through central aperture 321 terminating, in the collapsed position of bellows 10, immediately adjacent bottom plate 11. The bottom of cylinder 322 is provided with inwardly turned flange 324, and a short sleeve 325 is mounted upright coaxially within cylinder 322 with its lower end resting on bottom 324 to which it is welded, registering with the central aperture 326 of bottom 324. The inside diameter of sleeve 325 is slightly larger than the diameter of aperture 326, thus forming an annular seat about the upper side of aperture 326 on which a valve plate 327 rests.

A muffler 330 having outwardly extending flange 331 at its inlet end is positioned extending upwardly above the central aperture 321 of plate 320 with flange 331 welded to flange 321 and with the inlet fitting 332 of muffler 330 facing valve plate 327. The diameter of fitting 322 is such that a coil spring 333 is snugly received about fitting 332 and is snugly received within sleeve 325. Spring 333 abuts at its lower end valve plate 327 and at its upper end the lower end of muffler 330 and is of proportion such that it is under substantial compression designed to relieve when the pressure against the underside of valve plate 327 exceeds 30 p.s.i. Muffler 330 suitably has low pass filter characteristics with a high frequency cut-off on the order of five cycles per second.

Within bellows 10 on the underside of top plate 320 there is also located an annular block 340 which has an inside diameter equal to the diameter of central opening 321 with which it registers and an outside diameter just clearing the inner edges of plates $15^n$ and $16^n$. Block 340 is welded to the under side of plate 320 and has a thickness vertically such that the lower face of block 340, in the collapsed position of bellows 10, just rests on plate 11.

Top 320 carries an annular weight 350 formed typically by casting lead between a pair of concentric hoops 351 and 352. Hoops 351 and 352 are positioned extending upwardly from top 320 to which they are welded at their lower ends, the outside diameter of steel hoop 351 coinciding with the outside diameter of top 320 while the inside diameter of hoop 352 just clears flanges 323 and 331.

As in the case of the device described in the preceding figures, suitable apertures, indicated by the reference numerals 342, 343, 344, and 345, are provided in top 320 for receiving a spark plug in the case of aperture 342 and flexible high pressure hose connections in the cases of apertures 343, 344 and 345. Such apertures overlay plate $16^n$ and access to such apertures is provided by welding four sleeves 346 onto the upper surface of top 320, each registering with one aperture 342, 343, 344 and 345 in order that when the lead weight 350 is cast between hoops 351 and 352 such apertures will be accessible.

Figure 8:
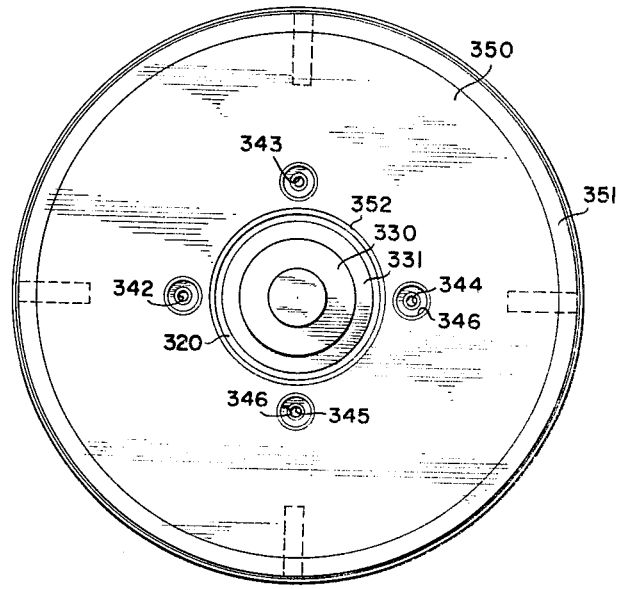
FIGURE 8 is a plan view of the device shown in FIGURE 7.
Figure 7:
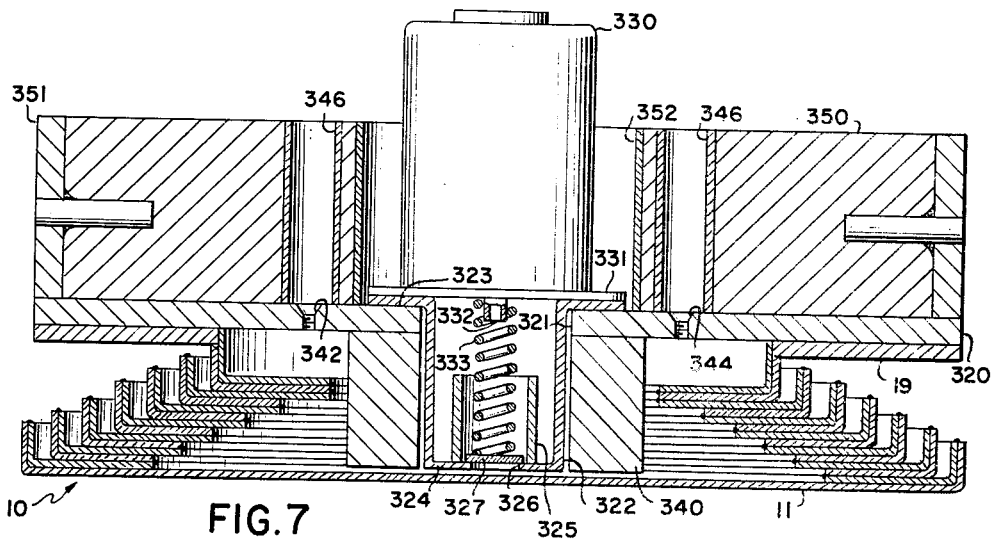
FIGURE 7 is a vertical section of another device constructed in accordance with my invention.

In operation the device described in FIGURES 7 and 8, as in the case of the devices described in preceding figures, is provided with an insulated electrical connection to a spark plug received in aperture 342 and with flexible high pressure hose connections in apertures 343, 344 and 345. One such hose connection is to a pressure gauge, while another is to pressured source of oxygen, and the last is to a pressured source of propane.

In this device, the admission of explosives and firing must be automatically controlled to provide a rapid succession of pulses. After each explosion, following collapse of the bellows, oxygen and propane are charged to a total pressure typically 10 p.s.i. Again approximately a stoichiometric ratio should be employed, but preferably the charge is metered, and both gases are charged simultaneously rather than utilizing the technique described above in which the quantities of gases were determined by individually charging them and observing the pressure. As soon as charging is complete the spark plug is ignited, as before, to set off the explosion.

When, however, weight 350 starts to rise the pressure of the explosion is placed on the underside of valve plate 327 which then yields permitting discharge of the exploding gases through muffler 330. Because of the low pass characteristics of the muffler, the generation of a sound wave of a frequency which would interfere with the detection of the desired seismic wave is prevented. Because of the rapid release of exploded gases through muffler 330 bellows 10 expands only momentarily and then collapses, at which point operation can be repeated as desired.

In each of the constructions shown the essential requirements are that the weight 30 or 350 be positioned above the bellows 10, 110 or 210, as the case may be, and that the bellows construction be capable only of vertical extension and resist lateral, i.e., radial movement, thus confining the entire expanding force of the explosion, so far as is practicable, between the bottom plate of the bellows assembly (and hence the surface of the ground on which it rests) and the weight 30 or 350 positioned above it.

I claim:
1. A device for initiating a seismic wave at the surface of the earth which includes means defining a vertically extensible closed chamber including a rigid, substantially flat, solid bottom adapted to be coupled to the ground and a rigid top positioned over said bottom and, a vertically extensible side wall joining said top and bottom thereby enclosing said chamber therebetween, said top having substantially greater mass than said bottom and side wall; fluid conduit means affixed to said chamber communicating with the interior of said chamber; and ignition means affixed to said chamber defining means on the interior thereof within said chamber.

2. A device according to claim 1 in which said vertically extensible side wall is a bellows.

3. A device according to claim 2 provided with a plurality of fast-rise, slow-fall shock absorbers resting on the surface of the earth about said bellows and affixed to said top at intervals thereabout.

4. A device according to claim 2 in which said bellows includes a plurality of annular plates, each having a turned flange at the rim thereof, said plates being positioned in a stack with the flanges nesting one within the other, each said plate in said stack except the plate at each end of said stack having a welded joint at its inner edge to the inner edge of the next adjacent plate on one side thereof and a welded joint at the edge of its turned flange to the edge of the turned flange of the next adjacent plate on the other side thereof.

5. A device for initiating a seismic wave at the surface of the earth which includes means defining a vertically extensible closed chamber including a rigid, substantially flat, solid bottom adapted to be coupled to the ground and a rigid top positioned over said bottom and, a vertically extensible side wall joining said top and bottom thereby enclosing said chamber therebetween regardless of the vertical displacement of said top from said bottom, said top having substantially greater mass than said bottom and side wall; fluid conduit means affixed to said chamber communicating with the interior of said chamber; and ignition means affixed to said chamber defining means on the interior thereof within said chamber.

6. A device according to claim 5 in which said vertically extensible side wall is a bellows.

7. A device according to claim 6 provided with a plurality of fast-rise, slow-fall shock absorbers resting on wall 33 excluding those vertical passages provided by sleeves 36. Such casting is denoted by the reference numeral 38, and typically, where the structure described has an overall diameter on the order of five feet, has a weight of four tons.

The structure of bellows 10 including its top 20 and weight 30 are secured together by bolts 39 passing through annular shelf 34, top 20 of bellows 10 and annular plate 19 as indicated more clearly in FIGURE 1.

Shock absorbers 50, which typically are six in number, are mounted in intervals about weight 30 for vertical movement by means of sleeves 51 constructed of cast iron pipe. The lower ends of sleeves 51 are welded to the rim of bottom 32 of tank 31 (see FIGURES 1 and 3). Shock absorbers 50 are further supported by means of fins 52 which extend radially outward from the upper portion of side wall 33 and above end of each sleeve 51. Each fin 52 on its under surface has a re-entrant portion overlying the upper end of sleeve 51 the sides of which abut opposite sides of sleeve 51 and are welded to such sides. Each shock absorber 50 is of the oleo-pneumatic type and is designed to open (rise) with little resistance but to close (fall) slowly with high internal resistance.

Each of shock absorbers 50, as can be seen in FIGURES 1 and 3, is mounted on an annular foot plate 64, which is positioned outside of and around bottom plate 11 of bellows 10, by means of a bracket 65 consisting of a pair of upright parallel plates welded on the upper surface of foot plate 64 which receive tongue 57 between them and to which tongue 57 is pivotally secured by means of a pin extending through the opposite sides of bracket 65 and tongue 57, as indicated by the reference numeral 66.

In operation ignition wire 24 is connected to a controllable source of high voltage which is preferably capable of operating on a programmed basis to provide one or more pulses of ignition current at a precisely determined time or times. One conduit 23 is connected to a pressure gauge for measuring the interior pressure of bellows 10; a second conduit 23 is connected through suitable valving to tanks of propane and oxygen; while the third conduit 23 is connected to an exhaust valve which is normally closed.

A manifold connecting the propane and oxygen supplies through a conduit 23 and to interior of bellows 10 is then manipulated first fully to charge bellows 10 with propane gas (conduit 23 in which the exhaust valve is located being temporarily opened to assure complete purging of the interior of bellows 10) and thereafter oxygen is admitted, the pressure of the interior of the bellows being utilized to estimate an approximate stoichiometric (5:1 ratio) mixture of gases. Typically the total pressure after charging both the propane and oxygen is on the order of 5 p.s.i.g.

Ignition wire 24 is then energized with a high potential at a precisely determined point in time to ignite the gases charged within bellows 10 to produce a confined explosion within bellows 10. Within two or three milliseconds after energization of spark plug 22, the resultant shock wave applies a sharp and intense compressive impulse against bottom plate 11 and the surface of the earth on which it rests thus initiating a seismic wave into the subsurface.

Subsequent to the initial impact of the explosion, the expanding gases raise weight 30 with concomitant vertical extension of bellows 10. As seen in FIGURE 4 the vertically extended flanges 12 and 14, 17 and 18, 17' and 18', etc. which are welded together do not separate while the inner edges of the various annular plates 13, 15', 16', etc. which are welded together are held together by expanding gas pressure thus preventing rupturing of the welds.

As expanding gases lift weight 30 to a maximum height shock absorbers 50 readily permit the vertical separation of weight 30 from bottom plate 11 of bellows 10. As, however, weight 30 reaches its maximum height, weight 30 rather than falling back suddenly collapsing bellows 10 in a manner which might induce a second seismic wave, settles back on bellows 10 slowly under the cushioning of shock absorbers 50. The exhaust valve remains closed until a period of time has elapsed sufficient for completion of the travel time of the propagated seismic wave to the most remote detector employed, or until the pressure inside of bellows 10 has declined, by virtue of expansion of the chamber or by virtue of cooling of the combustion gases within bellows 10, or both, to a value sufficiently low so that upon opening of the exhaust valve and discharge of combustion gases from bellows 10, no objectionable air blast is created. The latter criterion is controlling in pulsed or sequential firing where the total time during which the exhaust valve is closed, plus the time to recharge bellows 10 with a new charge of explosive mixture, is to be substantially less than the travel time of the seismic wave to the most distant detector.

Thus, while I have described the use of my device in connection with a single detonation within a detecting period, it will of course be apparent that by suitable electrical control of the manifolds for charging and exhausting the device and of the high voltage system for igniting the charged gases, the device can also be employed to generate a number of seismic waves in a pulsed manner according to any desired program to produce a series of seismic wave pulses within a given detecting period. In case of programmed control of the charging and exhaust valves and of the ignition system, the exhaust valve is opened preferably at, or near, the instant when the weight, after having risen to its maximum height, begins to drop back.

While I have described a particular bellows configuration it will be apparent that the chamber confining the explosive gases need not be a bellows construction but can be a telescopic arrangement as shown in FIGURE 5 in which the bellows is replaced by a pair of telescopic cylinders generally designated by the reference numeral 110 including a bottom cylinder 111 having a bottom plate 112 in which an upper, second cylinder 113 is received. The upper end of cylinder 113 is suitably welded to top closure 20 and at its lower end is provided with an outwardly extending flange 114 riding in sealing contact with the inner wall of cylinder 111, the upper end of which is provided with an inwardly turned flange 115 designed to limit upward extension of telescoping cylinder 110 by abutting flange 114.

Alternatively the bellows can be in the form of bellows 210 shown in FIGURE 6 which includes a stack of annular plates 211 of identical dimension placed on top of a circular bottom closure 212 and on which rests top 20 carrying above it weight 30 and the associated structure. In this arrangement each of annular discs 211 is welded to the disc 211 above it alternating between their inner and outer edges. The bottom plate 211 is welded at its outer edge to the outer edge of bottom plate 212 while the uppermost plate 211 is welded at its outer edge to the underside of top plate 20.

When a relatively rapid succession of impulses is desired, it is preferable to relieve the gas pressure of the exploded gases the moment the weight starts to rise, since all useful energy has been imparted into the earth at that point, in order to permit recharging rapidly. It is also desirable for such purpose to pre-compress the gases within the bellows and to confine the space they occupy to a minimum.

Referring more particularly to FIGURES 7 and 8, there is shown a modification of the device shown in FIGURES 1, 2 and 3, in which the same bellows construction is employed and which thus includes a rigid bottom plate 11 with the nest of annular steel plates 15, 16, 15', 16', etc. and plate 19. Top 20 of bellows 10 is replaced, however, with a top 320 which differs from top 20 in that it is annular.

the surface of the earth about said bellows and affixed to said top at intervals thereabout.

8. A device according to claim 6 in which said bellows includes a plurality of substantially flat annular plates, each having a turned flange at the rim thereof, said plates being positioned in a stack with the flanges nesting one within the other, each said plate in said stack except the plate at each end of said stack having a welded joint at its inner edge to the inner edge of the next adjacent plate on one side thereof and a welded joint at the edge of its turned flange to the edge of the turned flange of the next adjacent plate on the other side thereof.

References Cited by the Examiner
UNITED STATES PATENTS

| | | | |
|---|---|---|---|
| 1,231,302 | 6/1917 | Scott | 92—35 |
| 2,058,301 | 10/1936 | Doran | 113—116 |
| 2,071,583 | 2/1937 | Schutt | 113—116 |
| 2,104,776 | 1/1938 | Shaw | 113—116 |
| 2,772,746 | 12/1956 | Merten | 181—.53 |
| 3,029,733 | 4/1962 | McElroy | 181—.53 X |

BENJAMIN A. BORCHELT, *Primary Examiner.*
KATHLEEN CLAFFY, SAMUEL FEINBERG,
*Examiners.*